United States Patent
Zwilling et al.

(10) Patent No.: US 6,576,043 B2
(45) Date of Patent: Jun. 10, 2003

(54) RECOVERY OF NITROGEN AND LIGHT HYDROCARBONS FROM POLYALKENE PURGE GAS

(75) Inventors: Daniel Patrick Zwilling, Drexel Hill, PA (US); Timothy Christopher Golden, Allentown, PA (US); Edward Landis Weist, Jr., Macungie, PA (US); Keith Alan Ludwig, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/976,398

(22) Filed: Oct. 12, 2001

(65) Prior Publication Data

US 2003/0070546 A1 Apr. 17, 2003

(51) Int. Cl.⁷ ............................................. B01D 53/047
(52) U.S. Cl. ............................... 95/41; 95/100; 95/103; 95/105; 95/144; 96/110; 96/130; 96/134; 96/142
(58) Field of Search .................... 95/41, 96–98, 95/100–105, 143, 144; 96/110, 112, 122, 126–128, 130, 134, 136, 142

(56) References Cited

U.S. PATENT DOCUMENTS

| | | | | |
|---|---|---|---|---|
| 3,176,445 A | * | 4/1965 | Collins et al. | 95/144 X |
| 3,266,221 A | | 8/1966 | Avery | 55/58 |
| 3,430,418 A | | 3/1969 | Wagner | 55/25 |
| 3,564,816 A | * | 2/1971 | Batta | 95/143 X |
| 3,596,436 A | * | 8/1971 | Dassesse | 95/144 X |
| 3,721,064 A | * | 3/1973 | Symoniak et al. | 95/144 |
| 4,498,910 A | | 2/1985 | Benkmann | 55/18 |
| 4,608,061 A | * | 8/1986 | Volles et al. | 95/143 X |
| 4,727,122 A | * | 2/1988 | Lee et al. | 95/144 X |
| 4,769,047 A | | 9/1988 | Dye | 55/26 |
| 4,915,711 A | * | 4/1990 | Kumar | 95/143 X |
| 4,969,935 A | * | 11/1990 | Hay | 95/98 |
| 5,026,406 A | | 6/1991 | Kumar | 55/26 |
| 5,042,995 A | * | 8/1991 | Mitariten | 95/143 X |
| 5,137,548 A | * | 8/1992 | Grenier et al. | 95/41 |
| 5,152,812 A | | 10/1992 | Kovach | 55/23 |
| 5,177,293 A | | 1/1993 | Mitariten et al. | 585/655 |
| 5,220,796 A | | 6/1993 | Kearns | 62/18 |
| 5,245,099 A | * | 9/1993 | Mitariten | 95/144 X |
| 5,248,322 A | | 9/1993 | Kumar | 95/101 |
| 5,354,346 A | | 10/1994 | Kumar | 95/101 |
| 5,376,164 A | * | 12/1994 | Zarchy et al. | 95/41 |
| 5,453,113 A | | 9/1995 | Zarchy et al. | 95/41 |
| 5,507,857 A | * | 4/1996 | Kumar et al. | 95/144 X |
| 5,518,527 A | * | 5/1996 | Tomizuka et al. | 95/144 X |
| 5,547,492 A | * | 8/1996 | Cho et al. | 95/143 X |
| 5,656,065 A | * | 8/1997 | Kalbassi et al. | 95/105 X |
| 5,741,350 A | | 4/1998 | Rowles et al. | 95/42 |
| 5,744,687 A | | 4/1998 | Ramachandran et al. | 585/829 |
| 5,759,236 A | * | 6/1998 | Bruck et al. | 95/41 |
| 6,007,606 A | * | 12/1999 | Baksh et al. | 95/105 X |
| 6,120,581 A | * | 9/2000 | Markovs et al. | 95/144 X |
| 6,200,366 B1 | * | 3/2001 | Bulow et al. | 95/144 X |

* cited by examiner

Primary Examiner—Robert H. Spitzer
(74) Attorney, Agent, or Firm—John M. Fernbacher

(57) ABSTRACT

A method for the separation of a gas mixture comprises (a) obtaining a feed gas mixture comprising nitrogen and at least one hydrocarbon having two to six carbon atoms; (b) introducing the feed gas mixture at a temperature of about 60° F. to about 105° F. into an adsorbent bed containing adsorbent material which selectively adsorbs the hydrocarbon, and withdrawing from the adsorbent bed an effluent gas enriched in nitrogen; (c) discontinuing the flow of the feed gas mixture into the adsorbent bed and depressurizing the adsorbent bed by withdrawing depressurization gas therefrom; (d) purging the adsorbent bed by introducing a purge gas into the bed and withdrawing therefrom an effluent gas comprising the hydrocarbon, wherein the purge gas contains nitrogen at a concentration higher than that of the nitrogen in the feed gas mixture; (e) pressurizing the adsorbent bed by introducing pressurization gas into the bed; and (f) repeating (b) through (e) in a cyclic manner.

25 Claims, 5 Drawing Sheets

| BED | | | | | | | | | | | |
|---|---|---|---|---|---|---|---|---|---|---|---|
| 1 | A | | EQD | I | PP | BD | | P | EQR | PR | |
| 2 | EQR | PR | | A | | | EQD | I | PP | BD | P |
| 3 | BD | | P | EQR | PR | | A | | | EQD | I | PP |
| 4 | EQD | I | PP | BD | | P | EQR | PR | | A | |

A=ADSORPTION  BD=BLOWDOWN
EQD=EQUALIZATION (DEPRESS)  P=PURGE
I=IDLE  EQR=EQUALIZATION (REPRESS)
PP=PROVIDE PURGE  PR=PRODUCT REPRESSURIZATION

FIG. 2

RECOVERY OF NITROGEN AND LIGHT HYDROCARBONS FROM POLYALKENE PURGE GAS

STATEMENT REGARDING FEDERALLY SPONSORED RESEARCH OR DEVELOPMENT

This invention was made with government support under Contract No. DE-FC02-00CH110022 between Air Products and Chemicals, Inc. and the U.S. Department of Energy. The Government has certain rights to this invention.

BACKGROUND OF THE INVENTION

In the synthesis of polyalkenes such as polyethylene and polypropylene, solid particles of polymer product are withdrawn from the reactor with interparticle gaseous components present in the reactor. The solid polymer product is purged with an inert gas such as nitrogen before the product is pelletized, yielding a nitrogen-rich purge gas containing a number of hydrocarbon compounds including unreacted ethylene or propylene, some alkanes such as ethane or propane, possible co-monomers such as butene-1 and hexene-1, additives such as isobutane, isopentane, or isohexane which may be added to the reactor feed as diluents or moderators, and possibly small amounts of oligomers such as octene, decene, or heavier olefins. The hydrocarbon content of this product purge gas can range up to 50 mol % or higher, most of which consists of the valuable feed components ethylene or propylene. Recovery of these feed components and additional hydrocarbons utilized in the polymerization process is economically desirable. Heavier components such as oligomers, if present in the purge gas, may be detrimental to adsorption or low temperature condensation methods for recovering the valuable lighter components.

Improved methods for the recovery of ethylene or propylene from nitrogen-rich purge gas in the production of polyethylene or polypropylene are economically desirable. The presence of heavier hydrocarbons in the purge gas may adversely affect adsorption processes used for light hydrocarbon recovery, and methods for removing such heavy hydrocarbons can be beneficial for improved recovery of valuable ethylene or propylene monomers. The integrated process disclosed below and defined in the claims which follow addresses these problems and offers improved purge gas treatment for the recovery of alkene reactants for recycle to the polymerization reactor system and nitrogen for reuse as purge gas.

BRIEF SUMMARY OF THE INVENTION

The invention relates to a method for the separation of a gas mixture which comprises:
  (a) obtaining a feed gas mixture comprising nitrogen and at least one hydrocarbon having two to six carbon atoms;
  (b) introducing the feed gas mixture at a temperature of about 60° F. to about 105° F. into an adsorbent bed containing adsorbent material which selectively adsorbs the hydrocarbon, and withdrawing from the adsorbent bed an effluent gas enriched in nitrogen;
  (c) discontinuing the flow of the feed gas mixture into the adsorbent bed and depressurizing the adsorbent bed by withdrawing depressurization gas therefrom;
  (d) purging the adsorbent bed by introducing a purge gas into the bed and withdrawing therefrom an effluent gas comprising the hydrocarbon, wherein the purge gas contains nitrogen at a concentration higher than that of the nitrogen in the feed gas mixture;
  (e) pressurizing the adsorbent bed by introducing pressurization gas into the bed; and
  (f) repeating (b) through (e) in a cyclic manner.

The adsorbent bed may be one of a plurality of parallel adsorbent beds wherein each bed of the plurality of beds may be subjected in turn to (b) through (f). The purge gas of (d) may be provided by a portion of the depressurization gas from another adsorbent bed. A portion of the pressurization gas of (e) may be provided by a portion of the depressurization gas from another adsorbent bed. A portion of the pressurization gas of (e) may be provided by a portion of the effluent gas from another adsorbent bed. The plurality of parallel adsorbent beds may consist of four adsorbent beds.

The at least one hydrocarbon having two to six carbon atoms in the feed gas mixture may comprise at least one saturated hydrocarbon containing from two to four carbon atoms. The at least one hydrocarbon having two to six carbon atoms in the feed gas mixture may comprise at least one unsaturated hydrocarbon selected from ethylene and propylene. The adsorbent material may comprise silica gel, activated alumina, or silica gel and activated alumina. The temperature of the feed gas mixture may be maintained in a range of about 70° F. to about 95° F.

The feed gas mixture may be obtained from a polyalkene product purge gas which is partially condensed and separated into a product purge vapor and at least one product purge liquid, wherein the product purge vapor provides the feed gas mixture into the adsorbent bed.

In another embodiment, the invention relates to a method for the separation of a polyalkene product purge gas containing nitrogen and at least one unsaturated hydrocarbon selected from ethylene and propylene, which method comprises:
  (a) compressing the polyalkene product purge gas to yield a compressed product purge gas;
  (b) cooling the compressed product purge gas to yield a partially condensed product purge stream;
  (c) separating the condensed product purge stream into a product purge vapor and a product purge liquid;
  (d) warming the product purge vapor stream to yield a warmed product purge vapor stream; and
  (e) separating the warmed product purge vapor stream in a pressure swing adsorption process to yield a purified nitrogen product gas and a purified hydrocarbon product gas containing at least one unsaturated hydrocarbon selected from ethylene and propylene.

The method may further comprise recycling the purified hydrocarbon product gas by combining it with the polyalkene product purge gas prior to compression in (a). The cooling of the compressed product purge gas to yield a partially condensed product purge stream may be effected by
  (1) dividing the compressed product purge gas into a first product purge gas stream and a second product purge gas stream;
  (2) cooling the first product purge gas stream by indirect heat exchange with the product purge vapor stream to yield a first cooled and partially condensed purge stream;
  (3) cooling the second product purge gas stream by indirect heat exchange with a vaporizing process stream to yield a second cooled and partially condensed purge stream; and
  (4) combining the first and second cooled and partially condensed purge streams to yield the partially condensed product purge stream of (b).

The product purge liquid of (c) may be reduced in pressure to provide the vaporizing process stream of (3). The vaporizing process stream may be completely vaporized to yield a recovered product gas stream containing at least one unsaturated hydrocarbon selected from ethylene and propylene.

The compressed product purge gas may be cooled by indirect heat exchange with cooling water prior to dividing the compressed product purge gas. The second product purge gas stream may be cooled by indirect heat exchange with cooling water after dividing the compressed product purge gas. The temperature of the warmed product purge vapor stream may be maintained in a range of about 60° F. to about 105° F. If desired, the temperature of the warmed product purge vapor stream may be maintained in a range of about 60° F. to about 105° F. by controlling the flow rate of the first product purge gas stream. More specifically, the temperature of the warmed product purge vapor stream may be maintained in a range of about 70° F. to about 95° F.

The invention also includes a system for the separation of a gas mixture containing nitrogen and at least one hydrocarbon having two to six carbon atoms, which system comprises:

(a) compression means for compressing the gas mixture to yield a compressed gas mixture;

(b) cooling means for cooling the compressed gas mixture to yield a partially condensed stream;

(c) separating means for separating the partially condensed stream into a vapor stream and a liquid stream;

(d) heat exchange means to warm the vapor stream to yield a warmed vapor stream; and (e) a pressure swing adsorption system for separating the warmed vapor stream to yield a purified nitrogen product gas and a purified hydrocarbon product gas comprising at least one hydrocarbon which contains two to six carbon atoms.

The cooling means for cooling of the compressed gas mixture to yield a partially condensed stream may comprise (1) piping means to divide the compressed gas mixture into a first gas stream and a second gas stream;

(2) indirect heat exchange means for cooling the first gas stream by indirect heat exchange with the vapor stream of (c) to yield a first cooled and partially condensed stream;

(3) indirect heat exchange means for cooling the second gas stream by indirect heat exchange with a vaporizing process stream to yield a second cooled and partially condensed stream; and (4) piping means for combining the first and second cooled and partially condensed streams to yield the partially condensed stream of (b).

The system may further comprise piping means for recycling the purified hydrocarbon product gas and combining it with the gas mixture prior to the compression means of (a). In addition, the system may further comprise flow control means to control the flow rate of the gas stream of (1).

BRIEF DESCRIPTION OF SEVERAL VIEWS OF THE DRAWINGS

FIG. 2 is a cycle chart of an exemplary pressure swing adsorption process which may be used in the present invention.

DETAILED DESCRIPTION OF THE INVENTION

Figure 1:
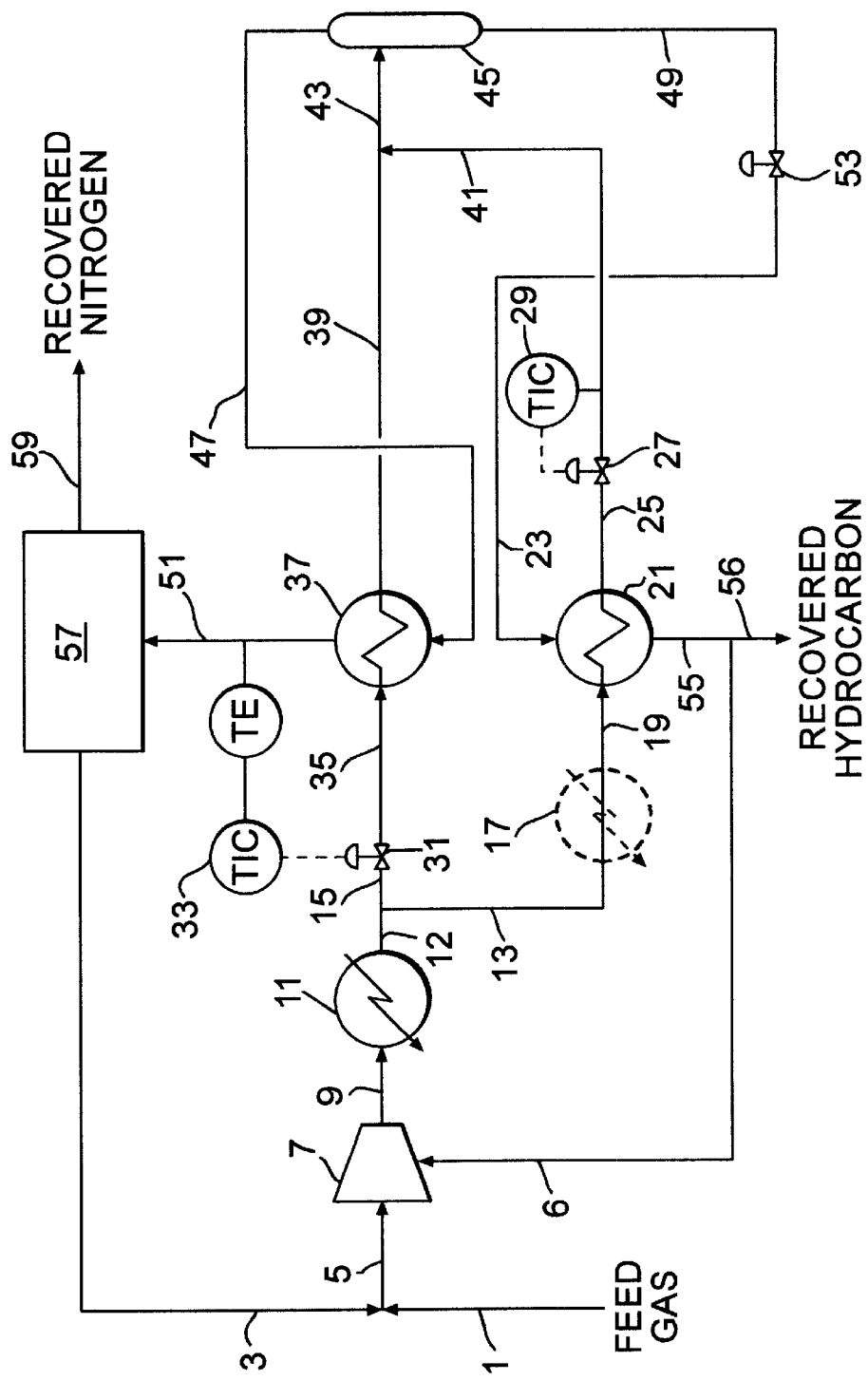
FIG. 1 is an exemplary schematic flowsheet of the process of the present invention.

The invention relates to a process for the separation of a gas mixture comprising nitrogen and at least one hydrocarbon having two to six carbon atoms. An exemplary embodiment is shown in FIG. 1, which illustrates the invention but does not limit the invention to any of the particular details described below. Polyalkene purge gas stream 1 is obtained from a polyethylene or polypropylene production plant in which nitrogen is utilized to purge solid particles of polymer product which are withdrawn from the polymerization reactor along with interparticle gaseous components. The solid polymer product is purged with nitrogen before the product is pelletized, yielding a nitrogen-rich polyalkene product purge gas containing a number of hydrocarbon compounds.

This purge gas stream typically contains nitrogen (10–95 mol %), the unreacted alkene monomers ethylene or propylene, and light alkanes such as ethane or propane. The purge gas also may contain some hydrocarbons of intermediate volatility such as isobutane, isopentane, butene-1, hexane, and hexene-1. Hydrogen also may be present in small concentrations. In addition, depending upon reactor system operation, the purge gas may contain varying concentrations of heavier molecular weight oligomers such as octene and decene and possibly other heavier hydrocarbons.

Purge gas feed stream 1, typically at a temperature of 70° F. to 200° F. and a pressure near ambient, optionally is combined with light hydrocarbon recycle stream 3 (later defined) to yield combined purge gas stream 5. Combined purge gas stream 5 is introduced into a first stage of compressor 7 and recycle stream 6 (later defined) may be introduced into an intermediate stage of compressor 7. Alternatively, if stream 6 is provided at a lower pressure, it may be combined with stream 5 prior to compressor 7. The discharge from compressor 7 provides compressed gas stream 9 at a pressure typically in the range of about 100 to 500 psia. Compressed gas stream 9 optionally may be cooled by indirect heat exchange with a cool fluid, typically water, in heat exchanger 11. Stream 12 after optional cooling is divided into first product purge gas stream 13 and second product purge gas stream 15. Stream 13 optionally may be cooled by indirect heat exchange with a cool fluid, typically water, in heat exchanger 17. In this embodiment, either heat exchanger 11 or heat exchanger 17 may be used to remove the heat of compression generated by compressor 7. If desired, both heat exchangers 11 and 17 may be used.

Purge gas stream 19, after optional cooling in heat exchanger 17, is further cooled and at least partially condensed in heat exchanger 21 by indirect heat exchange with vaporizing stream 23 (later defined). Cooled purge stream 25, typically at −120° F. to +50° F., flows through optional flow control valve 27 which is driven by optional temperature indicator and controller 29.

Second product purge gas stream 15 flows through optional flow control valve 31 which is driven by optional temperature indicator and controller 33. Purge gas stream 35 is cooled and may be at least partially condensed in heat exchanger 37 by indirect heat exchange with cold process stream 47 (later defined). Cooled purge stream 39 is combined with cooled purge stream 41 to form combined two-phase purge stream 43 which is typically at −115° F. to +50° F. Optionally, stream 43 may be further cooled by externally-supplied refrigeration (not shown).

Combined, cooled, two-phase purge stream 43 is separated in separator vessel 45 to yield product purge vapor stream 47 and product purge liquid stream 49. Product purge vapor stream 47 contains essentially all of the nitrogen present in purge gas feed stream 1, and also contains residual uncondensed alkene and other light hydrocarbons. Product purge liquid stream 49 contains the major portion of the alkene and other light hydrocarbons in purge gas feed stream 1, and contains essentially all of the heavier hydrocarbons present therein.

Product purge vapor stream 47 cools stream 35 in heat exchanger 37 as earlier described, and as a result stream 47 is warmed to yield purge vapor stream 51. Product purge liquid stream 49 is reduced in pressure across valve 53 to yield vaporizing stream 23 earlier described, and stream 23 is vaporized in heat exchanger 21 to yield recovered hydrocarbon stream 55. This stream contains essentially all alkenes, other light hydrocarbons, and heavier hydrocarbons (if present) in purge gas feed stream 1. Stream 6 may be withdrawn from stream 55 and recycled to compressor 7 as earlier described. The remaining portion of the recovered hydrocarbons in stream 56, after additional separation steps if required (not shown), may be recycled to the polyethylene or polypropylene production plant.

Purge vapor stream 51, typically containing 5 to 60 vol % hydrocarbons in nitrogen, is introduced into pressure swing adsorption (PSA) system 57 which separates the inlet stream into nitrogen product stream 59 and light hydrocarbon recycle stream 3 earlier described. Nitrogen product stream 59, which typically has a nitrogen concentration of at least 95 vol %, is recycled to the polyethylene or polypropylene production plant for reuse as purge gas. Overall recovery of the alkenes and other light hydrocarbons from purge gas feed stream 1 in recovered hydrocarbon stream 55 typically approaches 100%.

The temperature of purge vapor stream 51 which feeds PSA system 57 may be controlled by regulating the flow rate of second product purge gas stream 15, which flows through optional flow control valve 31, wherein the flow rate of stream 35 to heat exchanger determines the temperature of purge vapor stream 51. In the broadest embodiment of the invention, the temperature of purge vapor stream 51 may be in the range of about 60° F. to about 105° F. More specifically, the temperature of purge vapor stream 51 may be maintained in a range of about 70° F. to about 95° F.

PSA system 57 utilizes a cyclic multibed PSA process in which the hydrocarbon components are preferentially adsorbed and recovered by desorption, while the nitrogen is less strongly adsorbed and is recovered as unadsorbed gas. An exemplary PSA process which may be used in the present invention is illustrated in the cycle chart of FIG. 2. This exemplary process utilizes four parallel adsorbent beds with appropriate piping, manifolds, and valves as known in the art to control the gas flow and direction during the process steps described below. Other numbers of parallel beds may be used in a similar manner if desired. The adsorbent preferentially should adsorb the hydrocarbon components over nitrogen and should be easily regenerable by pressure reduction. In the present process, the adsorbent may be selected from activated alumina, silica gel, activated carbon, zeolite, or combinations thereof. Adsorbent particle diameters generally may range between 0.25 and 5 mm. Silica gel and activated alumina are particularly useful adsorbents for this application. If desired, a pretreatment layer of adsorbent may be installed at the feed end of the adsorbent bed to adsorb water and heavier hydrocarbons. This pretreatment layer may utilize activated alumina, silica gel, zeolite, zinc oxide, or activated carbon.

Referring now to FIG. 2, four adsorbent beds operate in parallel and in staggered cycles such that one bed is always on the adsorption or feed step. The sequential steps carried out in bed 1 are described below.

1) Adsorption

The feed gas to bed 1 is provided by purge vapor stream 51 (FIG. 1) at a typical pressure in the range of 100 to 500 psia and in a temperature range of about 60° F. to about 105° F. The temperature of purge vapor stream 51 may be maintained in a narrower range of about 70° F. to about 95° F. if desired. Bed 1 was repressurized in a previous step with product gas to prepare the bed for this adsorption step. The feed gas is introduced into a feed end of the adsorbent bed and the hydrocarbon components are preferentially adsorbed therein. A high purity nitrogen stream containing at least 95 vol % nitrogen is withdrawn from a product end of the bed into a product manifold which provides nitrogen product stream 59 of FIG. 1. The adsorption step proceeds for a predetermined time period and then is terminated, at which time the feed gas is directed to bed 2 of FIG. 2. A typical duration of this step may be 15 to 300 seconds.

2) Equalization (Depressurization)

Gas is withdrawn from the product end of bed 1 at decreasing pressure and is utilized to provide partial repressurization of bed 3, which has just completed a purge step. This step may last for 5 to 100 seconds.

3) Idle (Optional)

An idle step may be required at this point in the cycle wherein the bed is isolated until proceeding into the provide purge step below. The duration of this step may be zero to 150 seconds.

4) Provide Purge

Additional gas is withdrawn at decreasing pressure from the product end of bed 1 and this gas is utilized to purge bed 4, which has just completed a blowdown step. Typically, the duration of this step is 10 to 200 seconds.

5) Blowdown

Gas withdrawal continues from the product end of the bed at decreasing pressure and the blowdown gas may be recycled as stream 3 of FIG. 1 to increase the overall hydrocarbon recovery. The duration of this step may be 5 to 200 seconds.

6) Purge

Bed 1 is regenerated by introducing a purge gas into the product end and withdrawing a purge effluent gas from the feed end, wherein the purge gas is provided from bed 2. Purge may be carried out at pressures slightly above atmospheric pressure. Alternatively, if evacuation is used for further depressurization, purge may be effected at subatmospheric pressure. The purge effluent gas may be recycled as stream 3 of FIG. 1 to increase the overall hydrocarbon recovery. This step may be 10 to 200 seconds in duration.

7) Equalization (Repressurization)

Bed 1 is repressurized by introducing repressurization gas into the product end of the bed. Optionally, a portion of the product gas from bed 4 or from nitrogen product stream 59 of FIG. 1 simultaneously may be introduced into the product end of the bed. The duration of this step may be 5 to 100 seconds.

8) Product Repressurizaton

Equalization gas from bed 4 to bed 1 is discontinued and product gas repressurization continues until the pressure in bed 1 is sufficient to repeat step 1 and begin another cycle. The duration of this step typically is 10 to 200 seconds.

The following Examples illustrate the invention but do not limit the invention to any of the specific details described therein.

EXAMPLE 1

The pressure swing adsorption process of FIG. 2 was simulated using a computer program which models the dynamic response of a packed bed adsorption process. Adsorbent equilibrium parameters were fit from measured isotherm data and adsorbent mass transfer parameters were correlated to fit experimental pilot plant data. The feed to the PSA is provided at 220 psig and has a composition of 0.5% methane, 5.4% ethane, 14.2% isobutane, 30.3% ethylene, 47.1% nitrogen, and 2.6% hydrogen (all compositions in mole %). The tail gas (i.e. the purge effluent and blowdown gas) pressure is 5 psig and the nitrogen product contains 70–80 ppmv ethylene. Purge is carried out at pressures between 20 and 23 psia. The cycle step times in seconds are as follows: adsorption, 160; equalization (both depressurizing and repressurizing), 60; idle, 40; purge and provide purge, 60; blowdown, 100; and product repressurization, 100. The end-of-step pressures in psig are as follows: adsorption, 220; equalization (depressurizing), 130; idle, 130; provide purge, 79; blowdown, 5; purge, 5; equalization (repressurizing), 128; and product repressurization, 215. Silica gel is used as the adsorbent. The simulation was carried out for feed gas temperatures of 50° F., 70° F., 90° F., 110 °F., and 130° F. The total adsorbent working capacity and the nitrogen recovery were determined at each temperature.

EXAMPLE 2

The pressure swing adsorption process of FIG. 2 was simulated as in Example 1 with an idle step included between the blowdown and purge steps. The feed to the PSA is provided at 230 psig and has a composition of 0.5% methane, 2.0% ethane, 3.5% isobutane, 20.0% ethylene, and 74.0% nitrogen (all compositions in mole %). The tailgas (i.e. the purge effluent and blowdown gas) pressure is 6 psig and the nitrogen product contains 190 ppmv ethylene. Purge is carried out at pressures between 20 and 25 psia. The cycle step times in seconds are as follows: adsorption, 180; equalization (both depressurizing and repressurizing), 50; purge and provide purge, 100; blowdown, 60; and product repressurization, 130. Silica gel is used as the adsorbent. The simulation was carried out for feed gas temperatures of 45° F., 73° F., 95° F., and 120° F. The total adsorbent working capacity and the nitrogen recovery were determined at each temperature.

EXAMPLE 3

The pressure swing adsorption process of FIG. 2 was simulated as in Example 2. The feed to the PSA is provided at 230 psig and has a composition of 0.5% methane, 2.0% ethane, 12.5% isobutane, 30.2% ethylene, and 54.8% nitrogen (all compositions in mole %). The tail gas (i.e. the purge effluent and blowdown gas) pressure is 4 psig and the nitrogen product contains 174 ppmv ethylene. Purge is carried out at pressures between 19 and 25 psia. The cycle step times in seconds are as follows: adsorption, 180; equalization (both depressurizing and repressurizing), 50; purge and provide purge, 100; blowdown, 60; and product repressurization, 130. Silica gel is used as the adsorbent. The simulation was carried out for feed gas temperatures of 45° F., 70° F., 95° F., and 120° F. The total adsorbent working capacity and the nitrogen recovery were determined at each temperature.

EXAMPLE 4

The pressure swing adsorption process of FIG. 2 was simulated as in Example 2. The feed to the PSA is provided at 180 psig and has a composition of 0.5% methane, 2.0% ethane, 12.5% isobutane, 13.0% ethylene, and 72.0% nitrogen (all compositions in mole %). The tail gas (i.e. the purge effluent and blowdown gas) pressure is 6 psig and the nitrogen product contains 180 ppmv ethylene. The cycle step times in seconds are as follows: adsorption, 180; equalization (both depressurizing and repressurizing), 50; purge and provide purge, 100; blowdown, 60; and product repressurization, 130. Silica gel is used as the adsorbent. The simulation was carried out for feed gas temperatures of 45° F., 72° F., 95° F., and 120° F. The total adsorbent working capacity and the nitrogen recovery were determined at each temperature.

Figure 3:
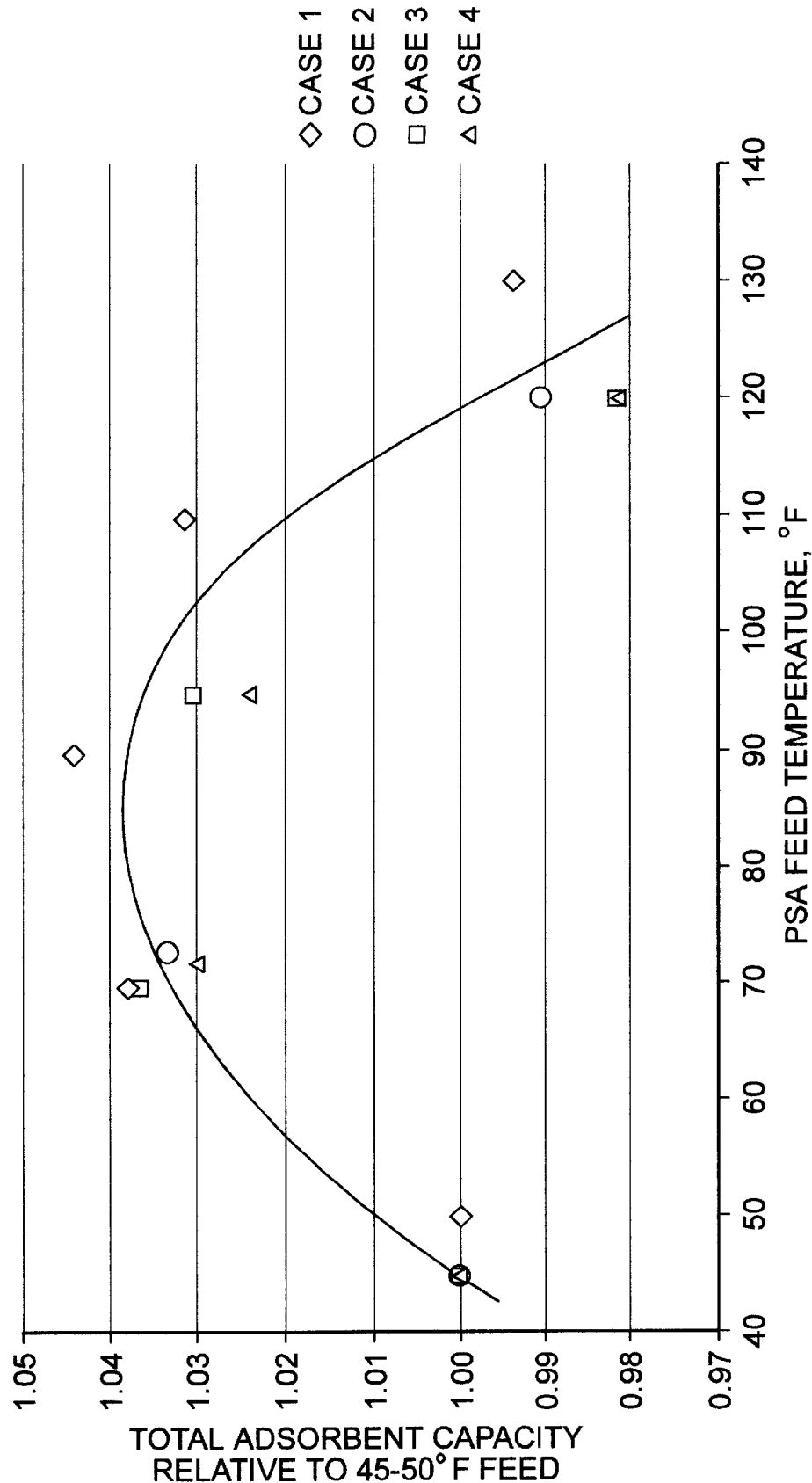
FIG. 3 is a plot of total adsorbent capacity vs. pressure swing adsorption feed gas temperature for four exemplary feed gas streams of the present invention.
Figure 4:
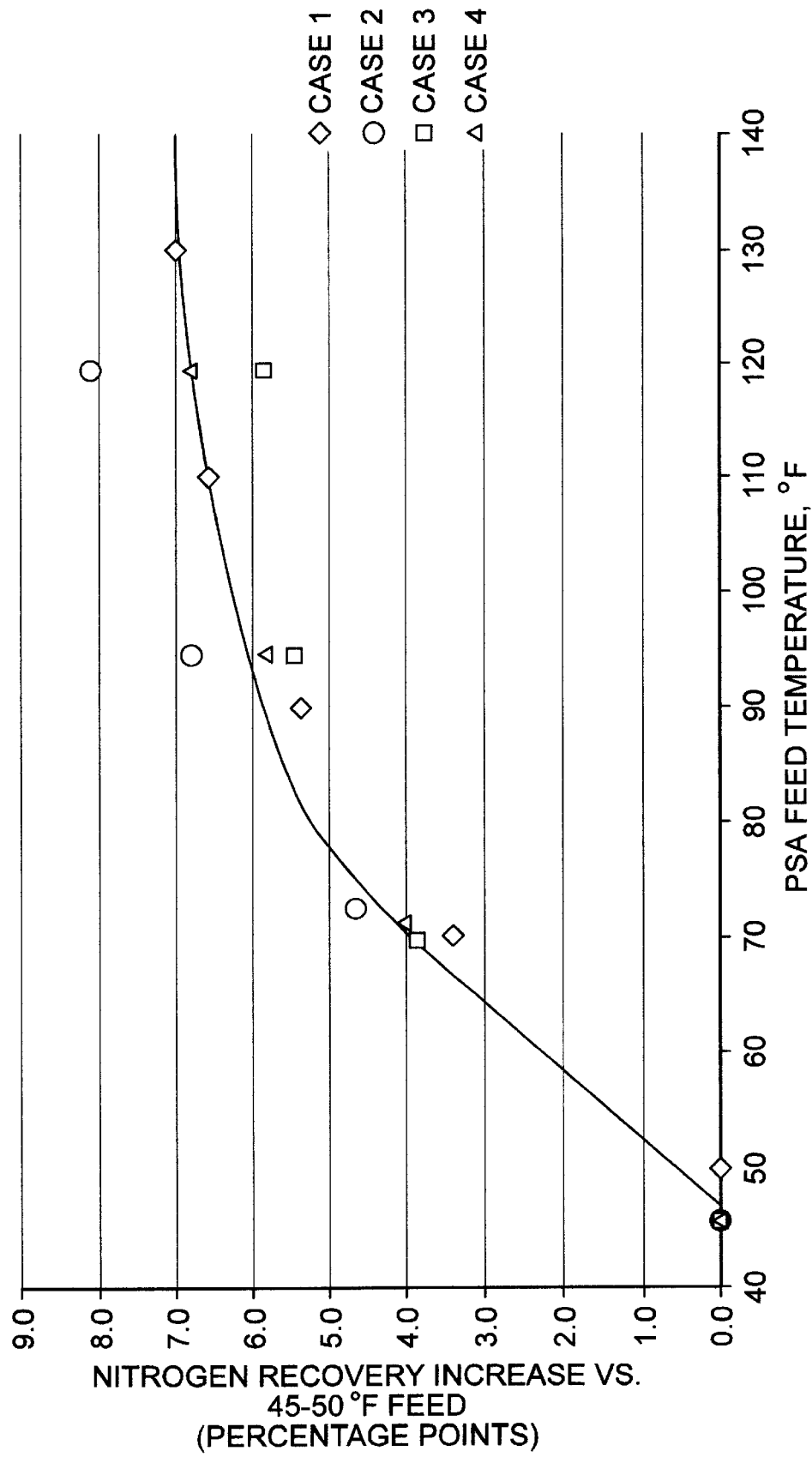
FIG. 4 is a plot of nitrogen recovery increase as a function of pressure swing adsorption feed gas temperature for four exemplary feed gas streams of the present invention.

The results of Examples 1–4 are given in FIGS. 3 and 4, and correspond to Cases 1–4 respectively. In FIG. 3, which is a plot of total adsorbent working capacity vs. feed temperature, it is seen that the total adsorbent capacity reaches a maximum between about 80 and 90° F. This indicates that the feed temperature preferably may be in the range of about 60° F. to about 105° F., and more preferably may be in the range of about 70° F. to about 95° F. It is seen in FIG. 4, which is a plot of nitrogen recovery relative to the recovery at 45–50° F., that nitrogen recovery increases with temperature. For example, the recovery at 120° F. is 6 to 8% higher than the recovery

EXAMPLE 5

A heat and material balance was carried out for the process of FIG. 1 using the PSA cycle of FIG. 2 for the separation of a nitrogen-propylene purge gas mixture. Cooler 11 was used and optional cooler 17 was not used. The PSA simulation method of the above Examples was used with cycle step times in seconds as follows: adsorption, 150; equalization (both depressurizing and repressurizing), 80; purge and provide purge, 100; blowdown, 50; and product repressurization, 70. A tail gas pressure of 5 psig was used. The PSA feed temperature was 50° F. and the feed pressure was 270 psia. A stream summary for the heat and material balance is given in Table 1.

TABLE 1

STREAM SUMMARY FOR EXAMPLE 5

| | STREAM NO. (FIG. 1) | | | | | | | | |
|---|---|---|---|---|---|---|---|---|---|
| | 1 | 3 | 5 | 6 | 12 | 19 | 23 | 25 | 35 |
| Component Mole Fraction | | | | | | | | | |
| Nitrogen | 0.665 | 0.450 | 0.571 | 0.024 | 0.182 | 0.182 | 0.024 | 0.182 | 0.182 |
| Propylene | 0.335 | 0.550 | 0.429 | 0.976 | 0.818 | 0.818 | 0.976 | 0.818 | 0.818 |
| Flow, Lb Mol/Hr | 32.2 | 25.0 | 57.2 | 141.0 | 198.2 | 196.0 | 152.0 | 196.0 | 2.2 |
| Temperature, °F. | 155.0 | 40.0 | 100.7 | 140.0 | 150.0 | 150.0 | 6.4 | 19.9 | 150.0 |
| Pressure, psia | 16.7 | 19.7 | 16.7 | 74.7 | 279.7 | 279.7 | 79.7 | 274.7 | 279.7 |
| Vapor Fraction | 1.00 | 1.00 | 1.00 | 1.00 | 1.00 | 1.00 | 0.07 | 0.23 | 1.00 |
| Liquid Fraction | 0.00 | 0.00 | 0.00 | 0.00 | 0.00 | 0.00 | 0.93 | 0.77 | 0.00 |
| Enthalpy, BTU/Lb Mol | 3719 | 4383 | 4009 | 9392 | 7710 | 7710 | 599 | 891 | 7710 |
| Ave. Molecular Weight | 32.7 | 35.8 | 34.1 | 41.7 | 39.5 | 39.5 | 41.7 | 39.5 | 39.5 |

| | STREAM NO. (FIG. 1) | | | | | | |
|---|---|---|---|---|---|---|---|
| | 39 | 43 | 47 | 49 | 51 | 56 | 59 |
| Component Mole Fraction | | | | | | | |
| Nitrogen | 0.182 | 0.182 | 0.702 | 0.024 | 0.702 | 0.024 | 1.000 |
| Propylene | 0.818 | 0.818 | 0.298 | 0.976 | 0.298 | 0.976 | 0.000 |
| Flow, Lb Mol/Hr | 2.2 | 198.2 | 46.2 | 152.0 | 46.2 | 11.0 | 21.2 |
| Temperature, °F. | 30.0 | 20.0 | 20.0 | 50.0 | 20.0 | 140.0 | 65.0 |
| Pressure, psia | 274.7 | 274.7 | 274.7 | 274.7 | 269.7 | 74.7 | 259.7 |
| Vapor Fraction | 0.25 | 0.23 | 1.00 | 0.00 | 1.00 | 1.00 | 1.00 |
| Liquid Fraction | 0.75 | 0.77 | 0.00 | 1.00 | 0.00 | 0.00 | 0.00 |
| Enthalpy, BTU/Lb Mol | 1226 | 895 | 1868 | 599 | 2173 | 9392 | −135 |
| Ave. Molecular Weight | 39.5 | 39.5 | 32.2 | 41.7 | 32.2 | 41.7 | 28.0 |

EXAMPLE 6

Figure 5:
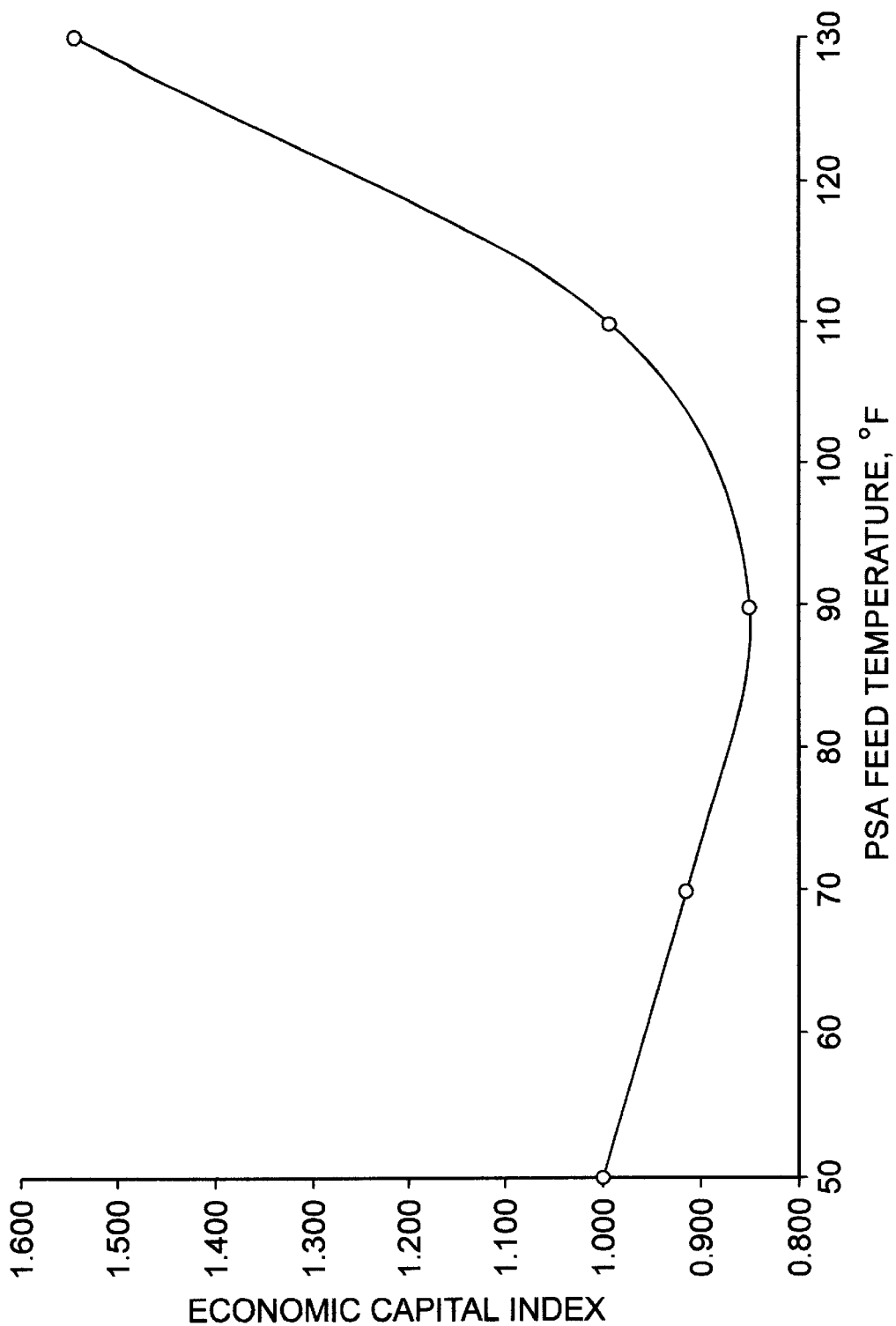
FIG. 5 is a plot of an economic capital index vs. pressure swing adsorption feed gas temperature for an exemplary feed gas stream of the present invention.

The heat and material balance information of Example 5 was used to size the equipment items required for the process of FIG. 1 and a capital cost estimate was prepared for the complete process as installed. This was repeated for PSA feed temperatures of 70° F., 90° F., 110° F., and 130° F. The total capital cost estimates for the five PSA feed temperatures were normalized to values corresponding to a PSA feed temperature of 50° F. to yield a normalized parameter defined as the economic capital index. The economic capital index was plotted against PSA feed temperature and the results are given in FIG. 5. It is seen that the capital cost is a strong function of PSA feed temperature; for the conditions used in these simulations and cost estimates, a PSA feed temperature of about 85° F. to 90° F. is preferred and gives the lowest capital cost.

Thus the process of the present invention utilizes a combination of condensation and pressure swing adsorption to realize high recoveries of valuable alkene and nitrogen components in polyolefin plant purge gas. The PSA feed temperature may be controlled in a desired range to minimize the overall capital cost of the recovery system. The use of a condensation step prior to the PSA system may minimize or eliminate the presence of heavier hydrocarbons in the PSA feed gas. Essentially all of the valuable alkenes in the purge gas may be recovered for recycle, and up to 99% of the nitrogen may be recovered at high purity for reuse as a purge gas.

What is claimed is:

1. A method for the separation of a gas mixture which comprises:
    (a) obtaining a feed gas mixture comprising nitrogen and at least one hydrocarbon having two to six carbon atoms;
    (b) introducing the feed gas mixture at a temperature of about 60° F. to about 105° F. into an adsorbent bed containing adsorbent material which selectively adsorbs the hydrocarbon, and withdrawing from the adsorbent bed an effluent gas enriched in nitrogen;
    (c) discontinuing the flow of the feed gas mixture into the adsorbent bed and depressurizing the adsorbent bed by withdrawing depressurization gas therefrom;
    (d) purging the adsorbent bed by introducing a purge gas into the bed and withdrawing therefrom an effluent gas comprising the hydrocarbon, wherein the purge gas contains nitrogen at a concentration higher than that of the nitrogen in the feed gas mixture;
    (e) pressurizing the adsorbent bed by introducing pressurization gas into the bed; and
    (f) repeating (b) through (e) in a cyclic manner.

2. The method of claim 1 wherein the adsorbent bed is one of a plurality of parallel adsorbent beds and wherein each bed of the plurality of beds is subjected in turn to (b) through (f).

3. The method of claim 2 wherein the purge gas of (d) is provided by a portion of the depressurization gas from another adsorbent bed.

4. The method of claim 2 wherein a portion of the pressurization gas of (e) is provided by a portion of the depressurization gas from another adsorbent bed.

5. The method of claim 2 wherein a portion of the pressurization gas of (e) is provided by a portion of the effluent gas from another adsorbent bed.

6. The method of claim 2 wherein the plurality of parallel adsorbent beds consists of four adsorbent beds.

7. The method of claim 1 wherein the at least one hydrocarbon having two to six carbon atoms in the feed gas mixture comprises at least one saturated hydrocarbon containing from two to four carbon atoms.

8. The method of claim 1 wherein the at least one hydrocarbon having two to six carbon atoms in the feed gas mixture comprises at least one unsaturated hydrocarbon selected from ethylene and propylene.

9. The method of claim 1 wherein the adsorbent material comprises silica gel, activated alumina, or silica gel and activated alumina.

10. The method of claim 1 wherein the temperature of the feed gas mixture is maintained in a range of about 70° F. to about 95° F.

11. The method of claim 1 wherein the feed gas mixture is obtained from a polyalkene product purge gas which is partially condensed and separated into a product purge vapor and at least one product purge liquid, and wherein the product purge vapor provides the feed gas mixture into the adsorbent bed.

12. A method for the separation of a polyalkene product purge gas containing nitrogen and at least one unsaturated hydrocarbon selected from ethylene and propylene, which method comprises:

(a) compressing the polyalkene product purge gas to yield a compressed product purge gas;

(b) cooling the compressed product purge gas to yield a partially condensed product purge stream;

(c) separating the condensed product purge stream into a product purge vapor and a product purge liquid;

(d) warming the product purge vapor stream to yield a warmed product purge vapor stream; and (e) separating the warmed product purge vapor stream in a pressure swing adsorption process to yield a purified nitrogen product gas and a purified hydrocarbon product gas containing at least one unsaturated hydrocarbon selected from ethylene and propylene.

13. The method of claim 12 which further comprises recycling the purified hydrocarbon product gas by combining it with the polyalkene product purge gas prior to compression in (a).

14. The method of claim 12 wherein the cooling of the compressed product purge gas to yield a partially condensed product purge stream is effected by (1) dividing the compressed product purge gas into a first product purge gas stream and a second product purge gas stream;

(2) cooling the first product purge gas stream by indirect heat exchange with the product purge vapor stream to yield a first cooled and partially condensed purge stream;

(3) cooling the second product purge gas stream by indirect heat exchange with a vaporizing process stream to yield a second cooled and partially condensed purge stream; and (4) combining the first and second cooled and partially condensed purge streams to yield the partially condensed product purge stream of (b).

15. The method of claim 14 wherein the product purge liquid of (c) is reduced in pressure to provide the vaporizing process stream of (3).

16. The method of claim 15 wherein the vaporizing process stream is completely vaporized to yield a recovered product gas stream containing at least one unsaturated hydrocarbon selected from ethylene and propylene.

17. The method of claim 14 wherein the compressed product purge gas is cooled by indirect heat exchange with cooling water prior to dividing the compressed product purge gas.

18. The method of claim 14 wherein the second product purge gas stream is cooled by indirect heat exchange with cooling water after dividing the compressed product purge gas.

19. The method of claim 14 wherein the temperature of the warmed product purge vapor stream is maintained in a range of about 60° F. to about 105° F.

20. The method of claim 19 wherein the temperature of the warmed product purge vapor stream is maintained in a range of about 60° F. to about 105° F. by controlling the flow rate of the first product purge gas stream.

21. The method of claim 19 wherein the temperature of the warmed product purge vapor stream is maintained in a range of about 70° F. to about 95° F.

22. A system for the separation of a gas mixture containing nitrogen and at least one hydrocarbon having two to six carbon atoms, which system comprises:

(a) compression means for compressing the gas mixture to yield a compressed gas mixture;

(b) cooling means for cooling the compressed gas mixture to yield a partially condensed stream;

(c) separating means for separating the partially condensed stream into a vapor stream and a liquid stream;

(d) heat exchange means to warm the vapor stream to yield a warmed vapor stream; and (e) a pressure swing adsorption system for separating the warmed vapor stream to yield a purified nitrogen product gas and a purified hydrocarbon product gas comprising at least one hydrocarbon which contains two to six carbon atoms.

23. The system of claim 22 wherein the cooling means for cooling of the compressed gas mixture to yield a partially condensed stream comprises (1) piping means to divide the compressed gas mixture into a first gas stream and a second gas stream;

(2) indirect heat exchange means for cooling the first gas stream by indirect heat exchange with the vapor stream of (c) to yield a first cooled and partially condensed stream;

(3) indirect heat exchange means for cooling the second gas stream by indirect heat exchange with a vaporizing process stream to yield a second cooled and partially condensed stream; and (4) piping means for combining the first and second cooled and partially condensed streams to yield the partially condensed stream of (b).

24. The system of claim 23 which further comprises piping means for recycling the purified hydrocarbon product gas and combining it with the gas mixture prior to the compression means of (a).

25. The system of claim 23 which further comprises flow control means to control the flow rate of the gas stream of (1).

* * * * *